United States Patent [19]
Wood et al.

[11] Patent Number: 6,028,590
[45] Date of Patent: Feb. 22, 2000

[54] COLOR CONVERSION FOR PROCESSORS

[75] Inventors: Stephen V. Wood, Hillsboro; Larry E. Wickstrom, Portland, both of Oreg.

[73] Assignee: Intel Corporation, Santa Clara, Calif.

[21] Appl. No.: 09/137,890

[22] Filed: Aug. 20, 1998

[51] Int. Cl.$^7$ .................................................. G09G 5/02
[52] U.S. Cl. ............................................................ 345/154
[58] Field of Search ................................. 345/153–154, 345/199, 202, 431; 395/131; 364/526

[56] References Cited

U.S. PATENT DOCUMENTS

| | | | |
|---|---|---|---|
| H1506 | 12/1995 | Beretta | 345/199 |
| 5,233,684 | 8/1993 | Ulichney | 395/131 |
| 5,455,600 | 10/1995 | Friedman et al. | 345/153 |
| 5,572,236 | 11/1996 | Feig et al. | 345/154 |
| 5,668,890 | 9/1997 | Winkelman | 382/167 |
| 5,731,988 | 3/1998 | Zandi et al. | 364/526 |
| 5,784,050 | 7/1998 | Corry | 345/154 |
| 5,790,110 | 8/1998 | Baker et al. | 345/202 |
| 5,798,767 | 8/1998 | Poole et al. | 345/431 |
| 5,821,918 | 10/1998 | Reinert et al. | 345/154 |
| 5,850,208 | 12/1998 | Poole et al. | 345/153 |
| 5,864,345 | 1/1999 | Wickstrom et al. | 345/431 |

*Primary Examiner*—Matthew Luu
*Assistant Examiner*—Jeff Piziali
*Attorney, Agent, or Firm*—Blakely, Sokoloff, Taylor & Zafman LLP

[57] ABSTRACT

A method for color conversion is disclosed. The method includes the steps of generating constants from a number of points, spacing and an endpoint for YUV point spacing, adding a constant to a value representing image data to clamp the value towards a predetermined maximum range of image points, subtracting a second constant from the resulting sum value to clamp the sum value towards a predetermined minimum range representing points in an image graph, shifting the resulting difference using spacing information to generate a value for Y,U,V values, and combining the resultant Y,U,V values to generate palette indexes to represent given image data.

27 Claims, 7 Drawing Sheets

| Y (VALUE) | L (LEVEL) |
|-----------|-----------|
| 0..A−1    | 0         |
| A..B−1    | 1         |
| B..C−1    | 2         |
| C..D−1    | 3         |
| D..E−1    | 4         |
| E..255    | 5         |

FIG. 5

C_Y ClampHigh      0x0101010101010101 * $YK_h$

C_Y ClampLow       0x0101010101010101 * $YK_l$

C_V ClampHigh      0x0101010101010101 * $VUK_h$      ⎫

C_U ClampHigh      0x0101010101010101 * $VUK_h$      ⎬ 500

C_VU ClampLow      0x0101010101010101 * $VUK_l$      ⎭

```
paddusb    mmY, C_Y ClampHigh
psubusb    mmY, C_Y ClampLow
psrlw      mmY, 4
pand       mmY, C_0x0F0F0F0F0F0F0F0F    // mmY has Y' paddusb    mmV, C_V ClampHigh
psubusb    mmV, C_VU ClampLow
psrlw      mmV, 5
pand       mmV, C_0x0707070707070707    // mmV has V' paddusb    mmU, C_U ClampHigh
psubusb    mmU, C_VU ClampLow
psrlw      mmU, 5
pand       mmU, C_0x0707070707070707    // mmU has U' psllw      mmV, 2                        // V' * 4
paddusb    mmV, mmU                      // V' * 4+U'
movq       mmU, mmV                      // save V' * 4+U'
psllw      mmV, 4                        // (V' * 4+U') * 16
psubusb    mmV, mmU                      // (V' * 4+U') * 15
psubusb    mmV, mmU                      // (V' * 4+U') * 14 paddusb    mmY, mmV                      // ((V' * 4+U') * 14)+Y'
paddusb    mmY, C_0x0A0A0A0A0A0A0A0A    // Add Windows palette offset
```

COLOR CONVERSION FOR PROCESSORS

BACKGROUND OF THE INVENTION

(1) Field of the Invention

The present invention is in the field of video related operations.

(2) Description of Related Art

There have traditionally been several methods of color conversion for computer systems as related to video operations. Specifically, there are two types, one is memory intensive methods and the other is compute intensive methods. The memory intensive methods involve large look up tables containing YUV parameters representing image data and corresponding RGB parameters. An example of memory intensive methods is pre-calculated lookup tables as described in U.S. Pat. No. 5,233,684 issued Ulichnez. The compute intensive methods involve calculations similar to matrix multiplication for converting RGB parameters into corresponding YUV parameters. An example of compute intensive methods is International Radio Consultative Committee (CCIR) 601 method using formulas to generate RGB points, then finding the closest match in an RGB palette. CCIR-601 is an International Specification published in 1993 under the International Telecommunications Union, Radiocommunication Sector (ITU-R).

The memory intensive methods require extensive use of memory space and the compute intensive methods require time consuming calculations.

It is therefore desirable to have a method and apparatus for color conversion that not only obviates the need of a look up table inherent in memory intensive methods, but also obviates lengthy computational delays inherent in compute intensive methods.

BRIEF SUMMARY OF THE INVENTION

A method for color conversion is disclosed. The method includes the steps of generating constants from a number of points, spacing and an endpoint for YUV point spacing, adding a constant to a value representing image data to clamp the value towards a predetermined maximum range of image points, subtracting a second constant from the resulting sum value to clamp the sum value towards a predetermined minimum range representing points in an image graph, shifting the resulting difference using spacing information to generate a value for Y,U,V values, and combining the resultant Y,U,V values to generate palette indexes to represent given image data.

DETAILED DESCRIPTION OF THE INVENTION

A color converter of the present invention obviates the need for a look up table as used in traditional memory intensive methods of color conversion and is also faster than traditional compute intensive methods of color conversion. Although one embodiment is based on current MMX™ technology, the present invention may be applicable to other processor technology.

Figure 1A:
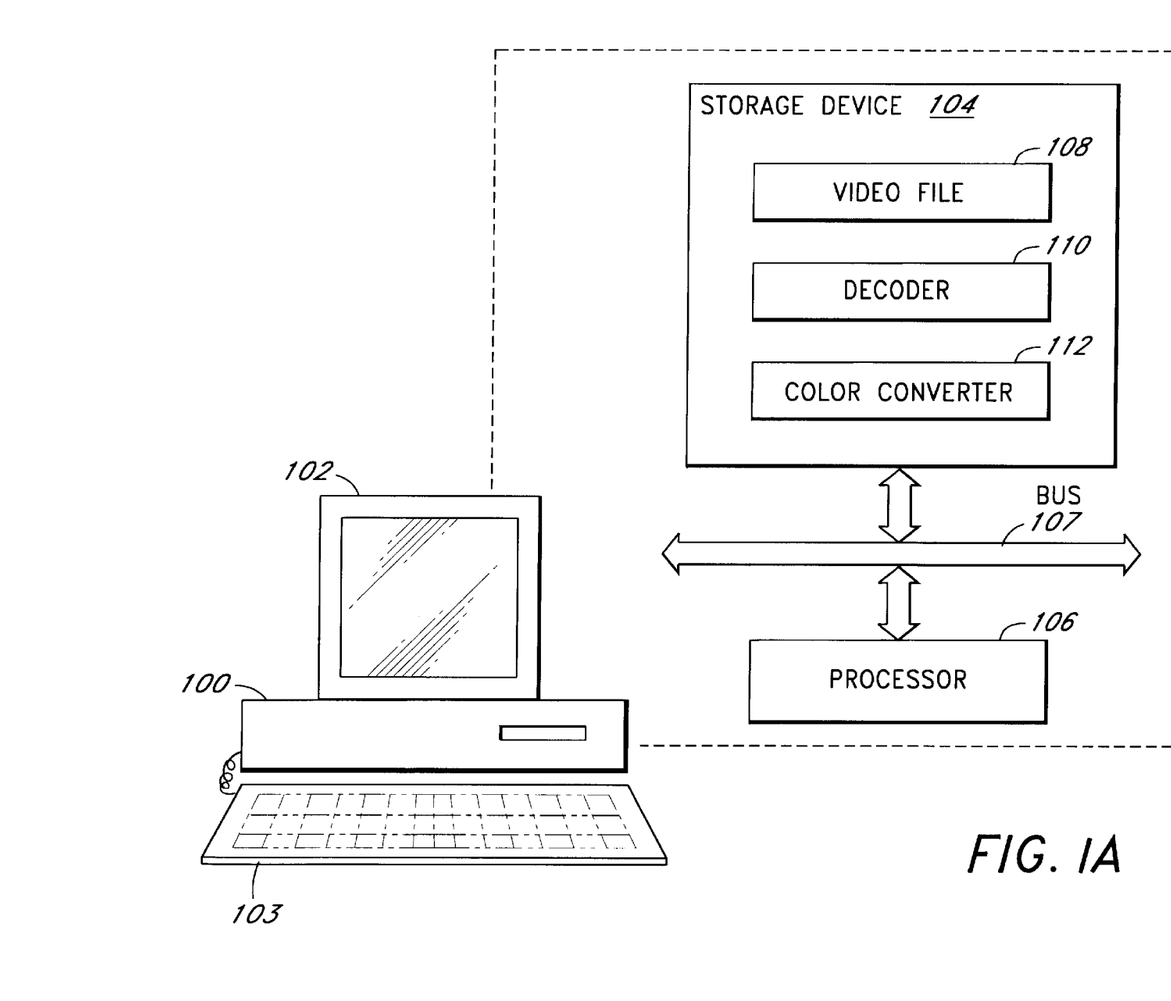
FIG. 1a illustrates an exemplary system of an embodiment of the present invention.

FIG. 1a illustrates an exemplary system of the present invention. Computer 100a has keyboard 103 and a monitor 102 set in eight bit color depth. The computer 100 has a storage device 104 coupled to a processor 106 via bus or busses 107. A compressed video file 108, comprises instructions for a decoder 110 and a color converter 112 all reside in the storage device 104. The compressed video file 108 stores video data for video scenes/frames. Decoder 110 decodes the video data into YUV data. The color converter converts the YUV data into palette indexes. A graphics card (not shown) coupled to the monitor 102 utilizes the palette indexes to display the video data on the monitor 102.

The Y value of the YUV image representation scheme represents luminance, separate from color, and denotes a brightness scale somewhere between black and white. The U and V values are color difference values describing colors. Video operations for display of video images require color conversions between two types of image representations, namely between YUV and RGB. RGB stands for red, green and blue. Both image representation schemes are described in detail in the CCIR-601 from ITU-R published in 1993.

In the present invention, a palette with certain constraints are selected. The constraints include YUV spacing. More specifically, in the present invention, U point spacing is a power of 2 ($U_A$), the V point spacing is a power of 2 ($V_A$) and the Y point spacing is a power of 2 ($Y_A$). In the described embodiment of the present invention, it is assumed that the number of palette entries ($U_n \times V_n \times Y_n$) is less than 256 which is the CCIR-601 specified legal maximum value for YUV (or 236 when implemented in conjunction with Windows™ operating system) made available from Microsoft Corporation.

Using a set of constraints represented by three parameters (discussed below), the present invention generates the placement of set of points in YUV space that provides good visual quality for the set of images the points will be used to represent. Further, the palette is arranged according to the color conversion method and apparatus of the present invention. For example, for each UV point, the Y points are laid out in increasing order: $U_0V_0Y_0$, $U_0V_0Y_1$ ... $U_0V_0Y_n$; $U_0V_1Y_0$ ... $U_0V_1Y_n$ and $U_nV_nY_0$ ... $U_nV_nY_n$.

Figure 1B:
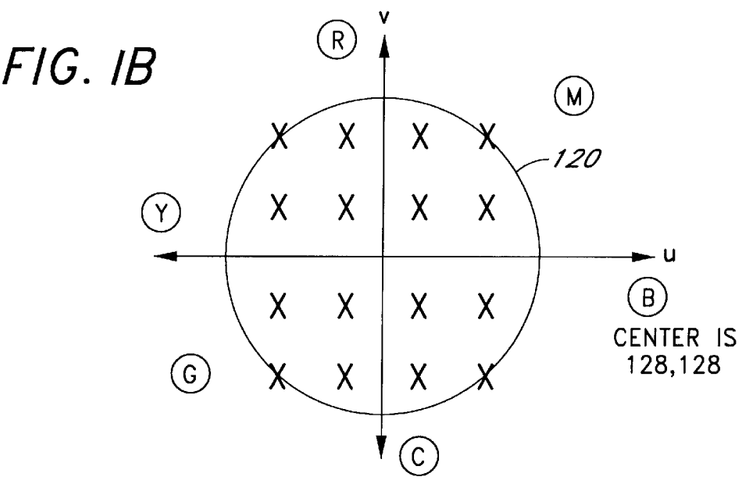
FIG. 1b illustrates a YUV Cartesian graph with exemplary arrangement of palette indexes.

FIG. 1b illustrates an exemplary UV Cartesian graph with 16 UV points and a randomly selected spacing enclosed in a circle. In the illustrated UV Cartesian graph with the center (128, 128), each circle illustrates the area and type of coloring that is desirable for a particular image to be represented by the points. The present invention's color converter 112 generates palette indexes according to a palette or set of points that will carefully match the area covered by a given circle corresponding to an image to be represented.

For example, circle 120 appears to be evenly covered by the already illustrated set of points. The present invention generates palette indexes that will cover the desired space represented here on the UV Cartesian graph by first generating constant values $K_h$ (high range value) and $K_l$ (low range value) from constraints represented by three parameters, namely the number of points n, spacing P (a power of 2) and endpoint E. These three parameters define the way the set of points are laid out on the UV space represented by the UV Cartesian graph.

With the present invention, the three parameters may be specified dynamically, and the resultant constants recalculated at any time, possibly as the result of analyzing an image content or the image to be represented by the set of points. Likewise, the palette indexes may be generated dynamically.

Figure 2:
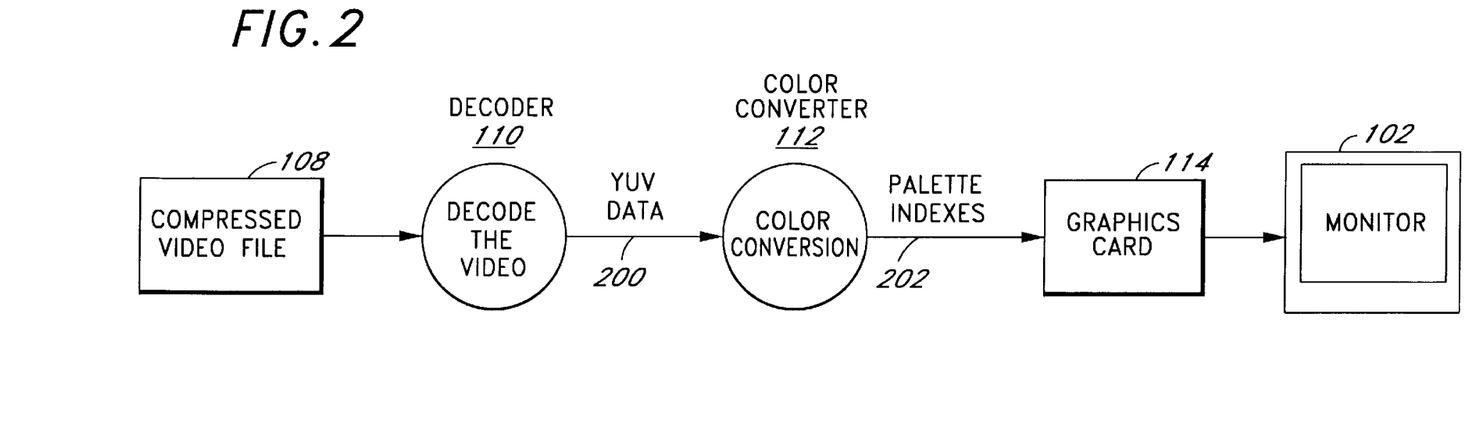
FIG. 2 is a process flow diagram of an embodiment of the present invention.

FIG. 2 is a process flow diagram of the present invention. Video data for each video frame/scene is filed in a video file 108 residing in a storage device 104 decompressed before decoded. Each video frame data is decoded by a decoder 110 which decodes the video data into YUV data 200. The YUV data 200 is then converted by a color converter 112, which outputs palette indexes 202. The palette indexes 202 are then forwarded to a graphics chip or a graphics card 114 attached to the monitor 102 for use in the display of the video data on the monitor 102.

Figure 3A:
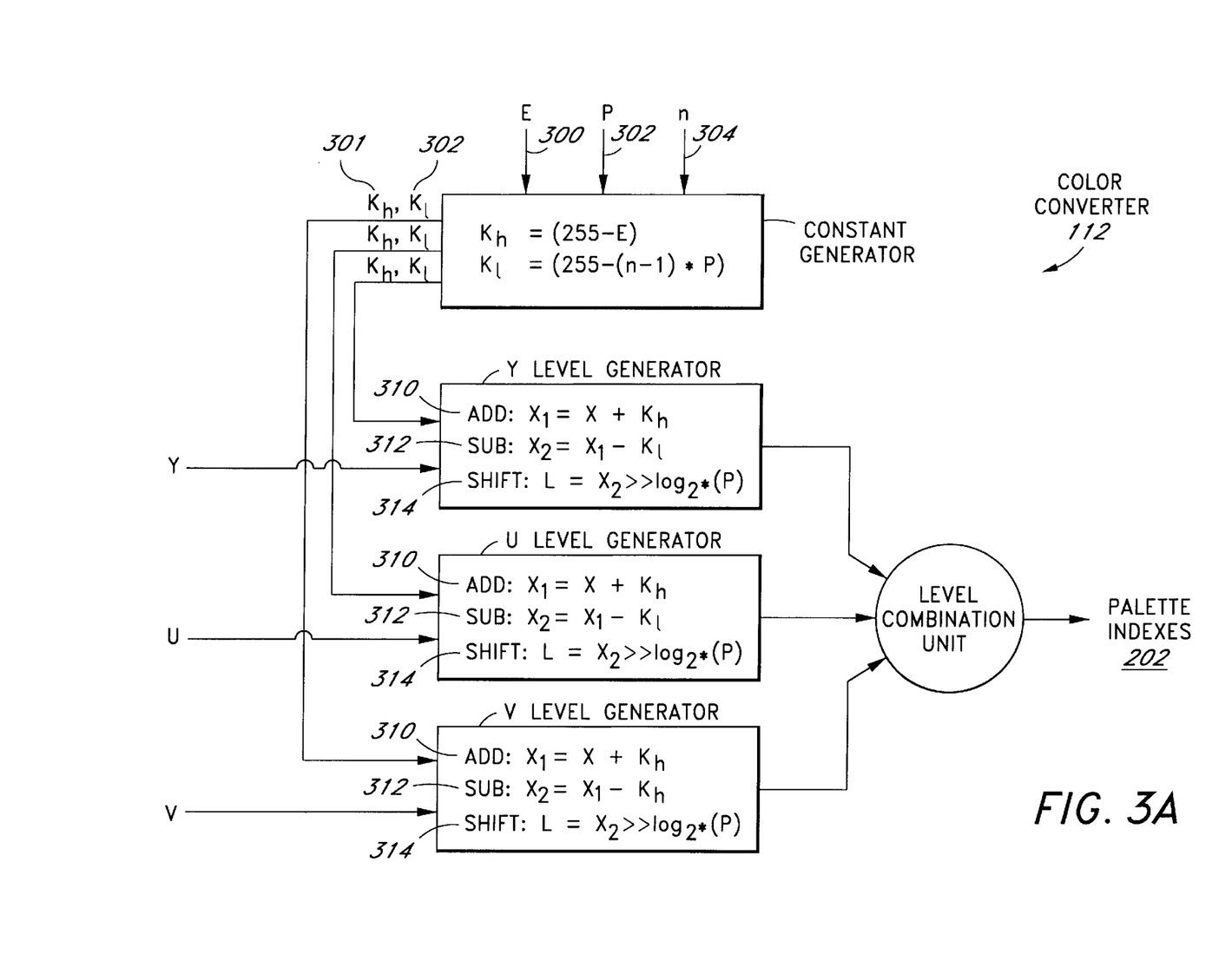
FIG. 3a illustrates the color converter of an embodiment of the present invention in more detail.

FIG. 3a illustrates the color converter of the present invention in more detail. The color converter first generates mapping level (L) values for the Y, U and V values separately and combines them to create palette indexes. For each Y, U and V value, constant values $K_h$ 301 and $K_l$ 302 are generated from three parameters, namely E (endpoint) 300, P (spacing) 302, and n (number of points) 304. The constant values $K_h$ 301 and $K_l$ 302 are then utilized to perform an add 310, a subtract 312 and a shift 314 operation for each Y, U and V value.

Figure 3B:
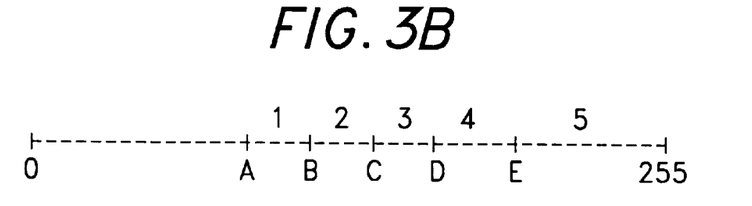
FIG. 3b illustrates an exemplary line graph showing a range of 0 to 255 with a value X represented by A, B, C, D, E, all within the given range.
Figure 3C:
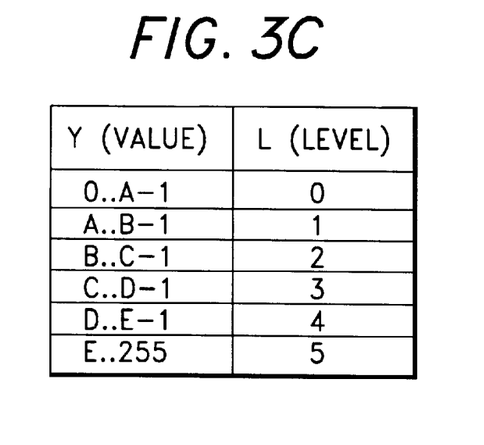
FIG. 3c illustrates mapping of the X values to corresponding levels (L).

The present invention maps a value X in the color range of (0 . . . 255) to one of several possible levels L where the levels have a difference of a power of 2. For example, FIG. 3b illustrates an exemplary line graph showing a color range of 0 to 255 with an image data value X represented by A, B, C, D, E, all within the given range and where B−A (B minus A) is a power of 2 referred to herein as P. Mapping is then performed by the present invention as illustrated in FIG. 3c. The method and apparatus for generating the mapping from a value X to a level L is performed by the color converter 112 of the present invention.

More specifically, to generate an appropriate level L value for a given image data X, the constant values $K_h$ and $K_l$ are generated from E (endpoint), P (spacing) and n (number of points) values. Since the input data is in the YUV color space, the palette is arranged in a YUV space ordering. Selecting a set of 236 or less colors which will be optimal for all possible images is not feasible. However, colors selected somewhat near the U,V center point, which is gray, provides acceptable results for the majority of given images.

In one embodiment of the present invention, the arrangement selected consists of 16 U,V points of 14 Y (brightness) levels each. The embodiment illustrated is selected because the specified set of UV points and Y (brightness) levels provide acceptable representation of the majority of images. Given this example, the selection of the present invention yields 224 palette entries. Similarly, given this example, the palette is arranged in 16 view sets, with brightness levels varying within each set. All Y, U and V values are in the range between (0 . . . 255). Determination of the actual palette values is performed based on the CCIR-601 specification, which is well-known in the art.

For example, in one application, the V pixel component (pel) points selected are 96, 128, 160 and 192. Similarly, the U pel points are 96, 128, 160 and 192. No restrictions are placed on the V and U planes to have the same points or the same number of points or the same spacing. The Y points begin at 16 and increase by 16. No restrictions are placed on the Y points to begin or end on a particular value. The only restrictions are that $Y_A$, $U_A$ and $V_A$ be powers of 2, and that $U_n \times V_n \times Y_n$ be less than or equal to 256 (236 when implemented in conjuction with Windows™ systems).

Thus, for example, for both the U and V planes, the E point given in the above described scenario is 176, the spacing (P) is 32, and n is 4. The values yield a constant $K_h$ (high range value) and constant $K_l$ (low range value) for UV plane as follows:

$UVK_h = (255 - E)$, or 79;

$UVK_l = (255 - (n-1) \times P)$, or 159.

For the Y plane, given the above described scenario, the E point is 216, spacing (p) is 16 and n is 14. The values yield:

$YK_h = (255 - 216)$, or 39;

$YK_l = (255 - (n-1) \times P)$, or 47.

Thus, the $K_h$ value is derived by (255−E) and the constant $K_l$ is derived by $K_l = (255 - (n-1) \times P)$. The E point is the last pel point value, minus half of the spacing to accomplish proper rounding.

Once constants $K_h$ and $K_l$ are derived, L levels for a value X to be converted is generated by first adding the constant $K_h$ to the X value, then clamp the X value to 255, then a subtraction of $K_l$ from the clamped sum ($X_1$) is performed. The result is then clamped to 0 ($X_2$), and then the level L is determined through a shift operation as follows: $L = X_2 >> \log_2(P)$.

For example, a V pel value of 130 will go through the following operations:

| | | |
|---|---|---|
| V = 130 | | (X) |
| Add $UVK_h$: | 130 + 79 = 209 | |
| Clamp to 255: | 209 (no change) | ($X_1$) |
| Subtract $UVK_l$: | 209 − 159 = 50 | |
| Clamp to 0: | 50 (no change) | ($X_2$) |
| Shift left by $\log_2(32)$: | 50 > > 5 = 1 | (L) |

In additional example, a Y pel value of 225 will go through the following operations:

| | | |
|---|---|---|
| Y = 225 | | (X) |
| Add $YK_h$: | 225 + 39 = 264 | |
| Clamp to 255: | 255 | ($X_1$) |
| Subtract $YK_l$: | 255 − 47 = 208 | |
| Clamp to 0: | 208 (no change) | ($X_2$) |
| Shift left by $\log_2(16)$: | 208 > > 4 = 13 | (L) |

Given the exemplary numbers we used to generate the constants K for high (h) and low (l) range values, for any color (YUV) there is a mapping to one of the 224 possible colors by the following: V'=(0 . . . 3) by the clamping and scaling functions performed, U'=(0 . . . 3), and Y'=(0 . . . 13) where the parenthesized numbers are level values (L). The number of level values L for V is 4 (0, 1, 2, 3), the number of level values L for U is 4 (0, 1, 2, 3) and the number of level values L for Y is 14 (0, 1, . . . , 13). The index is then generated by (((V'×(number of level values L for U and V))+U')×(level value L for Y))+Y' or (((V'×4)+U')×14)+Y'. Those skilled in the art will appreciate that for a Windows™ palette where only 236 palette entries are offered, the offset 10 must also be added to get past the reserved ten entries at the beginning of the palette.

Although FIG. 3a illustrates an implementation or embodiment of the present invention wherein the constants are generated internally prior to the add, subtract and shift operations, in an alternate embodiment, the constants may be preselected prior to the execution of the present invention's software program running and utilized as runtime constants.

Figure 4:
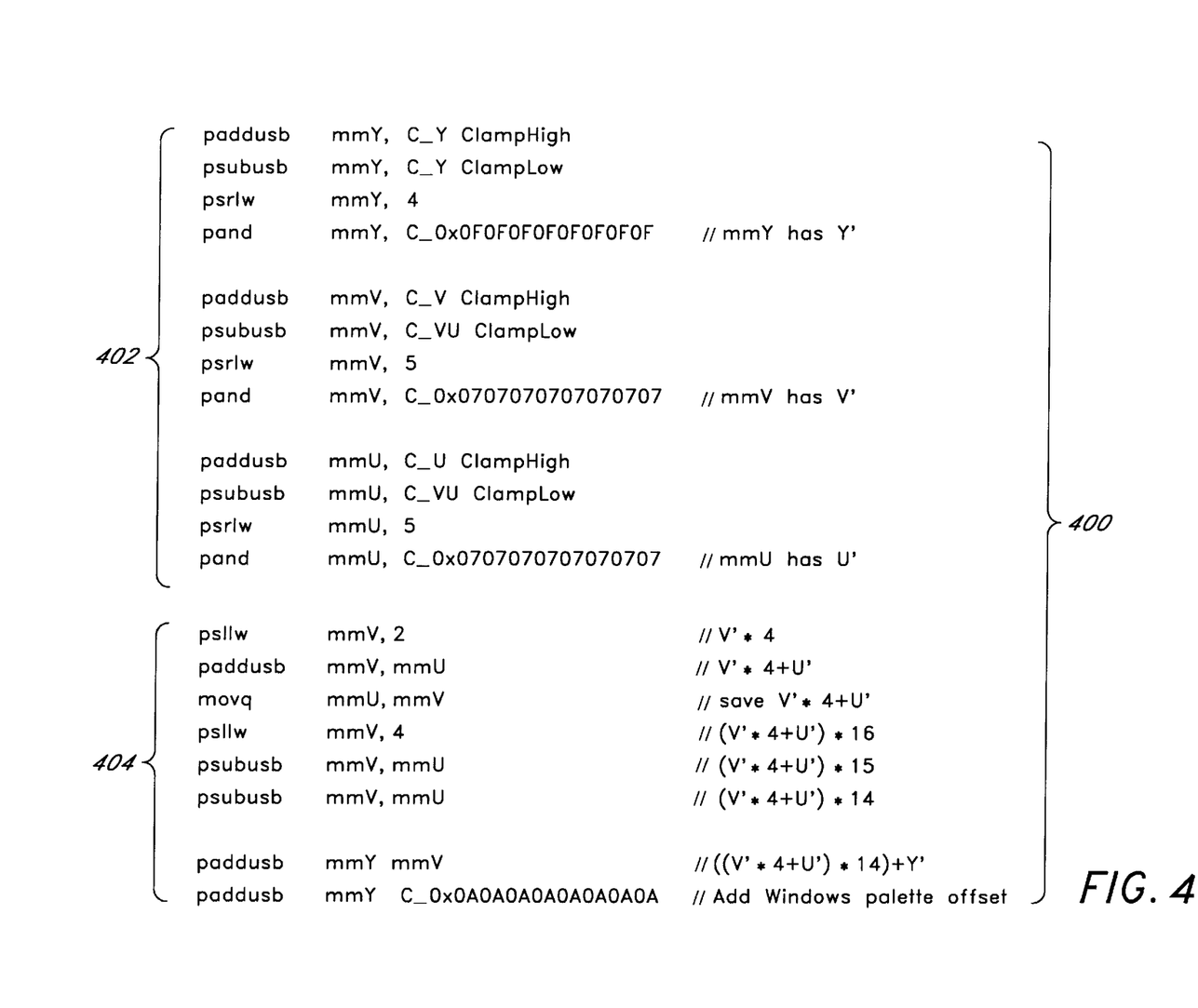
FIG. 4 illustrates an exemplary implementation an embodiment of the present invention.

FIG. 4 illustrates an exemplary implementation of the present invention. The MMX™ technology register file allows the computation of 8 output pels simultaneously, beginning with 8 U pels and mmU, 8 V pels in mmV and 8 Y pels in mmY.

More specifically, code 400 illustrates an exemplary code sequence using MMX™ technology instructions, also available for Pentium™ processors. Code region 402 describes operations performed on the Y values of the YUV set. The first instruction PADDUSB performs the adding operation as was described, the second instruction PSUBUSB performs a subtraction operation as was described, the PSRLW performs a shift operation as described, and the PAND removes extraneous information from the resultant value. The four instructions in sequence are performed on each of the YUV values, and the next set of instructions 404 combines the resultant values to generate palette indexes.

Thus the illustrated sequence of MMX™ technology instructions generate the 8 palette indexes. The register mmY now contains the 8 correct palette indexes. The exemplary implementation does not show a dithering step to change the constants to gain better precision.

Figure 5:
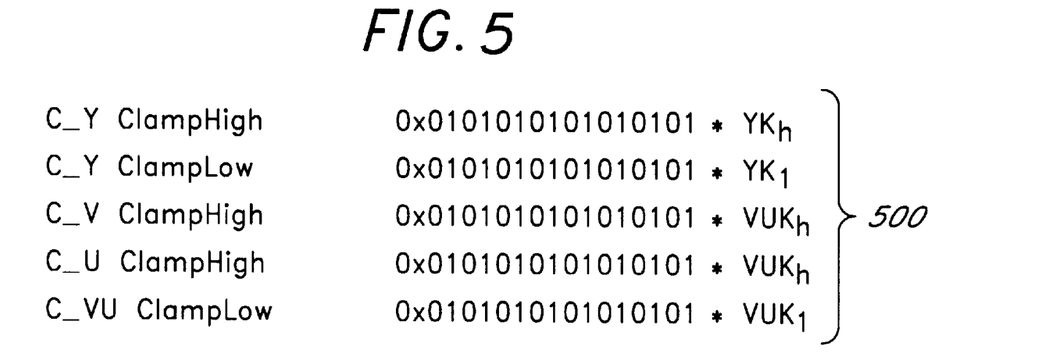
FIG. 5 illustrates values for the constants without dithering.

For example, FIG. 5 illustrates values 500 for the constants without dithering. Appropriate constants can be added to C_YClampHigh, C_VClampHigh, and C_UClampHigh to accomplish dithering at no additional instruction cost. In the given embodiment, dithering may be performed on a 4×4 block basis resulting in different C_YClampHigh, C_VClampHigh and C_UClampHigh constants for each of the four lines in the block.

Arbitrary embodiments may have a different range than the (0 . . . 255) range for input pels. The invention may also be used for different color space conversions or for non-image data, for example any three-dimensional to three-dimensional space conversion, where speed is critical, and results do not require high precision.

Figure 6A:
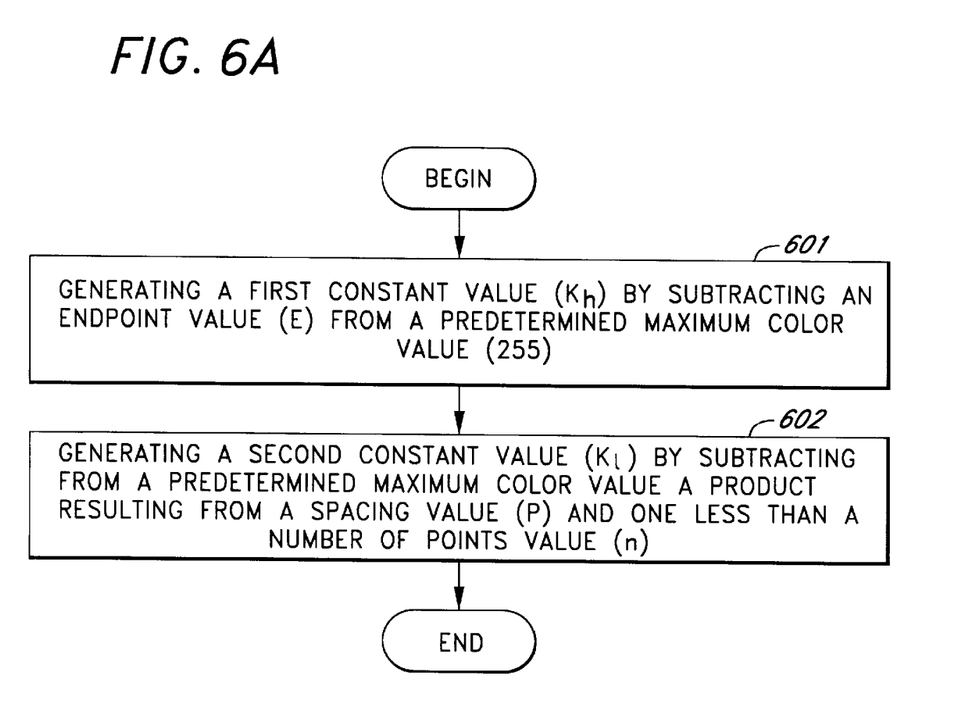
FIGS. 6a and 6b are flow diagrams illustrating the steps operated on by an embodiment of the present invention.
Figure 6B:
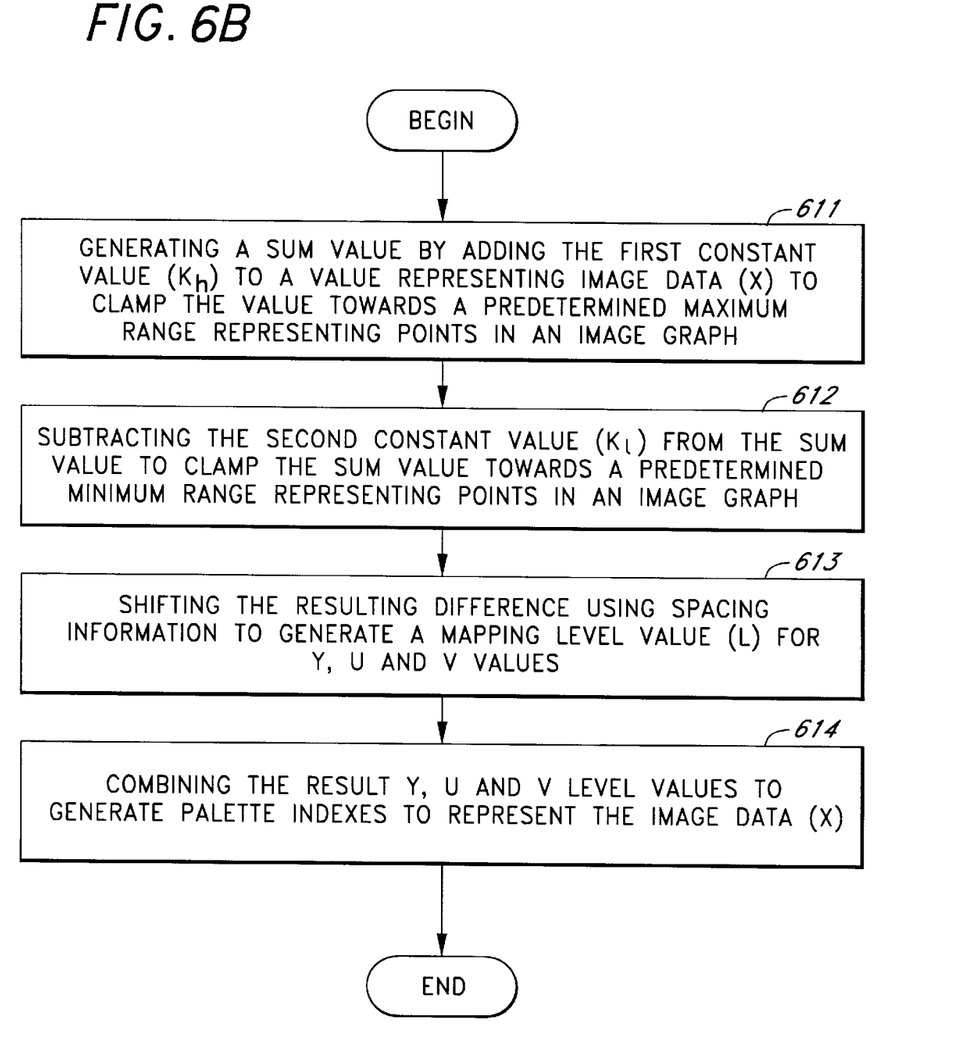

FIGS. 6a and 6b are flow diagrams illustrating the general steps followed by the present invention's color converter 112. FIG. 6a illustrates the general steps followed by the color converter 112 in generating the constants. In step 601, a first constant value ($K_h$) is generated by subtracting an endpoint value (E) from a predetermined maximum color value for example, (255). In step 602, a second constant value ($K_l$) is generated by subtracting from a predetermined maximum color value a product resulting from a spacing value (P) and one less than a number of points value (n).

FIG. 6b illustrates the general steps followed by the color converter 112 in processing the YUV data to generate the palette indexes. In step 611, a sum value is generated by adding the first constant value ($K_h$) to a value representing image data (X) to clamp the value towards a predetermined maximum range representing points in an image graph. In step 612, the second constant value ($K_l$) is subtracted from the sum value to clamp the sum value towards a predetermined minimum range representing points in an image graph. In step 613, the resulting difference is shifted using spacing information to generate a mapping level value (L) for YUV values. In step 614, the resultant YUV level values are combined to generate palette indexes to represent the image data (X).

What has been illustrated is a method and apparatus for color conversion for representing video images, without the need for a look up table and that is faster than traditional compute intensive methods. The present invention may be used for different color space conversions or for non-image data. For example, any three dimensional to three dimensional space conversion where speed is critical and the number of points mapped to is sparse is an ideal candidate for an implementation of the present invention.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for color conversion, comprising:

generating a first constant and a second constant from an upper endpoint value, a spacing value, and a number of points value for a set of palette indexes;

adding the first constant to a value representing image data to clamp the value towards a predetermined maximum value;

subtracting the second constant from a resulting sum value to clamp said sum value towards a predetermined minimum value;

shifting a resulting difference value proportional to the spacing value to generate an index value to represent said image data.

2. The method of claim 1 further comprising dithering the first constant and the second constant to gain further precision in said image data to be represented by said index value.

3. The method of claim 1 wherein generating said first constant further comprises subtracting the upper endpoint value from said predetermined maximum value.

4. The method of claim 1 wherein generating said second constant further comprises subtracting from said predetermined maximum value a product resulting from said spacing value and one less than said number of points value.

5. The method of claim 1 wherein generating said first constant and said second constant comprises preselecting and utilizing said first constant and said second constant as run time constants.

6. The method of claim 1 further comprising generating said first constant and said second constant each time said palette indexes are generated.

7. A method for mapping a color value to one of a plurality of color indices, said color value having a maximum color value, said method comprising:

adding a first value to the color value to produce a first result;

limiting the first result to the maximum color value;

subtracting a second value from the first result to produce a second result;

limiting the second result to zero; and dividing the second result by a third value to produce one of the plurality of color indices;

wherein
said first value is a difference between the maximum color value and a color value represented by a largest color index;
said second value is A−(B×(C−1)) where A is the maximum color value, B is a power of 2 that is a difference in color values represented by any two adjacent color indices, and C is a number of color indices in the plurality of color indices; and
said third value is B.

8. The method of claim 7 wherein the color value represents one dimension of a color space.

9. The method of claim 8 wherein the color space is a YUV color space and the color value represents one of a Y dimension, a U dimension, or a V dimension.

10. The method of claim 7 wherein the plurality of color indices represent the one dimension of the color space in a color palette.

11. A program, embodied in data signals, for mapping a color value to one of a plurality of color indices, said color value having a maximum color value, said program comprising:
a first segment for adding a first value to the color value to produce a first result and limiting the first result to the maximum color value;
a second segment for subtracting a second value from the first result to produce a second result and limiting the second result to zero; and
a third segment for dividing the second result by a third value to produce one of the plurality of color indices;
wherein
said first value is a difference between the maximum color value and a color value represented by a largest color index;
said second value is A−(B×(C−1)) where A is the maximum color value, B is a power of 2 that is a difference in color values represented by any two adjacent color indices, and C is a number of color indices in the plurality of color indices; and
said third value is B.

12. The program of claim 11 wherein the color value represents one dimension of a color space.

13. The program of claim 12 wherein the color space is a YUV color space and the color value represents one of a Y dimension, a U dimension, or a V dimension.

14. The program of claim 11 wherein the plurality of color indices represent the one dimension of the color space in a color palette.

15. The program of claim 11 wherein the data signals are signals embodied on computer-readable media or signals embodied in a carrier wave.

16. An apparatus for mapping a color value to one of a plurality of color indices, said color value having a maximum color value, said apparatus comprising:
an adder that adds a first value to the color value to produce a first result, the first result being limited to the maximum color value;
a subtractor that subtracts a second value from the first result to produce a second result, the second result being limited to zero; and
a divider that divides the second result by a third value to produce one of the plurality of color indices;
wherein
said first value is a difference between the maximum color value and a color value represented by a largest color index;
said second value is A×(B×(C−1)) where A is the maximum color value, B is a power of 2 that is a difference in color values represented by any two adjacent color indices, and C is a number of color indices in the plurality of color indices; and
said third value is B.

17. The apparatus of claim 16 wherein the color value represents one dimension of a color space.

18. The apparatus of claim 17 wherein the color space is a YUV color space and the color value represents one of a Y dimension, a U dimension, or a V dimension.

19. The apparatus of claim 16 wherein the plurality of color indices represent the one dimension of the color space in a color palette.

20. The apparatus of claim 16 wherein the divider is a shift register.

21. A system for displaying video data comprising:
a decoder that decodes the video data to produce a plurality of color values;
a color converter for mapping each of the plurality of color values to one of a plurality of color indices, said plurality of color values having a minimum color value and a maximum color value, said color converter including, an adder that adds a first value to the color value to produce a first result,
the first result being limited to the maximum color value, a subtractor that subtracts a second value from the first result to produce
a second result, the second result being limited to zero, and
a divider that divides the second result by a third value to produce one of the plurality of color indices,
wherein
said first value is a difference between the maximum color value and a color value represented by a largest color index,
said second value is A−(B×(C−1)) where A is the maximum color value, B is a power of 2 that is a difference in color values represented by any two adjacent color indices, and C is a number of color indices in the plurality of color indices, and
said third value is B;
a visual display unit that produces an image representation responsive to the plurality of color indices.

22. The system of claim 21 wherein the color value represents one dimension of a color space.

23. The system of claim 22 wherein the color space is a YUV color space and the color value represents one of a Y dimension, a U dimension, or a V dimension.

24. The system of claim 21 wherein the plurality of color indices represent the one dimension of the color space in a color palette.

25. The system of claim 21 wherein the divider is a shift register.

26. The system of claim 21 further comprising a storage device that stores the video data.

27. The system of claim 21 further comprising a graphics card that produces a signal responsive to the plurality of color indices, wherein the visual display unit produces the image representation responsive to the signal.

* * * * *